United States Patent
Morishima

(10) Patent No.: US 8,182,957 B2
(45) Date of Patent: May 22, 2012

(54) FUEL CELL, POLYMER ELECTROLYTE AND ION-EXCHANGE RESIN FOR THE SAME

(75) Inventor: Makoto Morishima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 763 days.

(21) Appl. No.: 11/528,344

(22) Filed: Sep. 28, 2006

(65) Prior Publication Data

US 2007/0178348 A1  Aug. 2, 2007

(30) Foreign Application Priority Data

Feb. 1, 2006  (JP) .................. 2006-024046

(51) Int. Cl.
*H01M 8/10* (2006.01)
(52) U.S. Cl. ............................................. 429/492
(58) Field of Classification Search .................. None
See application file for complete search history.

(56) References Cited

U.S. PATENT DOCUMENTS

| | | | | |
|---|---|---|---|---|
| 5,900,327 A | * | 5/1999 | Pei et al. .................. | 428/690 |
| 5,985,477 A | * | 11/1999 | Iwasaki et al. ............ | 429/493 |
| 6,194,092 B1 | * | 2/2001 | Ohara et al. .............. | 429/9 |
| RE37,284 E | * | 7/2001 | Li et al. .................... | 429/32 |
| 6,653,749 B2 | * | 11/2003 | Delbridge ................. | 307/85 |
| 7,001,865 B2 | * | 2/2006 | Tada et al. ................. | 502/185 |

FOREIGN PATENT DOCUMENTS

| | | |
|---|---|---|
| JP | 06-093114 | 4/1994 |
| JP | 10-168328 | 6/1998 |
| JP | 2004047400 | * 2/2004 |

OTHER PUBLICATIONS

Biswas et al, a cation exchange resin from poly(n-vinyl carbazole), Die Angewandte makromlekulare chemie, 1978, 72, pp. 57-66.*
Xia et al, decreased aggregatopm phenomena in polyfluorenes by introducing carbazole copolymer units, 2001, macromolecules, 34, pp. 5854-5859.*
G. Klärner et al., Colorfast Blue-Light-Emitting Random Copolymers Derived from Di-*n*-hexylfluorene and Anthracene et al., Advanced Materials 1998, No. 13, pp. 993-997.
JP Office Action of Appln. No. 2006-024046 dated Jan. 11, 2011 with partial English translation.

* cited by examiner

*Primary Examiner* — Melvin Mayes
*Assistant Examiner* — Stefanie Cohen
(74) *Attorney, Agent, or Firm* — Antonelli, Terry, Stout & Kraus, LLP.

(57) ABSTRACT

A fuel cell includes an electrode assembly, current collectors, and electroconductive separators. The electrode assembly includes an anode, a cathode, and a polymer electrolyte membrane arranged between the anode and cathode. The current collectors are arranged adjacent to the anode and cathode, respectively. The electroconductive separates are arranged outside the current collectors and have passages for feeding gases to the anode and cathode. The polymer electrolyte membrane includes an aromatic polymer having a sulfoalkylfluorene unit in its principal chain. An ion-exchange resin is used for the solid polymer electrolyte. An electrolyte membrane uses the ion exchange resin. A membrane/electrode assembly is used for the fuel cell.

12 Claims, 3 Drawing Sheets

FUEL CELL, POLYMER ELECTROLYTE AND ION-EXCHANGE RESIN FOR THE SAME

CLAIM OF PRIORITTY

The present application claims priority from Japanese application serial no. 2006-24046, filed on Feb. 1, 2006, the content of which is hereby incorporated by reference into this application.

FIELD OF THE INVENTION

The present invention relates to a polymer electrolyte suitable as an electrolyte membrane, and a polymer electrolyte membrane, ion-exchange resin and a fuel cell using the electrolyte membrane. For example, such an electrolyte membrane is suitable for a fuel cell; an electrolyzer for water, halogen acid and sodium chloride; an oxygen concentrator; a humidity sensor; and a gas detector or the like.

CLAIM OF PRIORITTY

The present application claims priority from Japanese application serial no. 2006-24046, filed on Feb. 1, 2006, the content of which is hereby incorporated by reference into this application.

BACKGROUND OF THE INVENTION

Fluorine-containing electrolytes typified by perfluorosulfonic acid membranes have carbon-fluorine bonds, and are thereby chemically very stable. Consequently, they are used as solid polymer electrolyte membranes for a fuel cells and for electrolyzers for water, sodium chloride, and halogen acids. In addition, they are applied to humidity sensors, gas sensitive detectors, and oxygen concentrators by using their proton conductivity.

Such fluorine-containing electrolytes are very expensive, because producing thereof needs special method. In addition, when producing halogen compounds and wasting it, due consideration must be given to a facility for preventing environmental pollution. Demands have therefore been made on proton-conductive polymer electrolytes of non-fluorine base which are inexpensive and environmentally harmless.

Examples of inexpensive solid polymer electrolyte membranes can be found as aromatic hydrocarbon electrolyte membranes including, for example, sulfonated polyether ether ketones, sulfonated polyether sulfones, sulfonated acrylonitrile-butadiene-styrene copolymers, sulfonated polysulfides, and sulfonated polyphenylenes in Japanese Unexamined Patent Application Publication (JP-A) No. Hei 06-93114.

Sulfonated aromatic hydrocarbon electrolyte membranes can be more easily produced at lower cost than fluorine-containing electrolyte membranes typified by Nafion (registered trademark) as the electrolyte membrane produced by Dupont Company. However, they are more liable to deteriorate by oxidation and to undergo desulfonation when used in cells.

Accordingly, the present invention is to provide a polymer electrolyte which is resistant to oxidation-induced deterioration and is highly durable. Another object of the present invention is to provide a polymer electrolyte membrane, a polymer electrolyte membrane/electrode assembly, and a fuel cell using the polymer electrolyte.

SUMMARY OF THE INVENTION

The present invention provides, as an embodiment, a fuel cell including a membrane/electrode assembly comprising an anode, a cathode, and a polymer electrolyte membrane arranged between the anode and the cathode, in which the polymer electrolyte membrane includes an aromatic polymer having at least one of fluorene group and carbazole group in its principal chain, the fluorene group and carbazole group each having at least one sulfoalkyl group.

The present invention further provides, in another aspect, an ion-exchange resin including an electrolyte copolymer, the copolymer-containing at least one of units represented by following Formulae (I), (II), and (III):

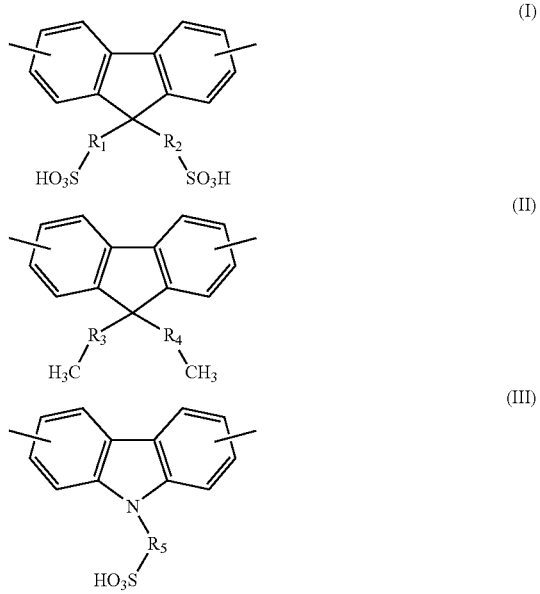

wherein each of $R_1$, $R_2$, $R_3$, $R_4$, and $R_5$ is independently a group selected from alkyl groups having one to six carbon atoms.

In yet another aspect, the present invention provides a membrane/electrode assembly including an anode, a cathode, and the ion-exchange resin arranged between the anode and the cathode.

The present invention further provides, in another aspect, a fuel cell including the membrane/electrode assembly.

In still another aspect, the present invention provides a polymer electrolyte composite membrane including a porous sheet having pores, and the ion-exchange resin charged in pores of the porous sheet at least in the surface layer thereof, in which the membrane is impermeable to fluids.

The present invention provides, in another aspect, a solution for coating an electrode catalyst, containing a solvent, and the ion-exchange resin dissolved in the solvent.

In addition, the present invention provides, in another aspect, an electrode paste for a fuel cell, containing the solution for coating an electrode catalyst, and carbon particles supporting a catalytic metal and being dispersed in the solution.

The present invention further provides, as an embodiment, a method of fabricating an electrode assembly including an electrode catalyst, the method including the steps of applying the electrode paste to a principal plane of an aromatic polymer electrolyte membrane, the aromatic polymer electrolyte membrane including an aromatic polymer having a sulfoalkyl-containing fluorene group in its principal chain, and drying the applied paste.

As yet another embodiment, the present invention provides a method of fabricating an electrode assembly including an electrode catalyst, the method including the steps of applying the electrode paste to gas-diffusion electroconductive sheets, and drying the applied paste, and attaching the coated surfaces of the diffusion sheets to the both sides of a principal plane of an electrolyte membrane including an aromatic polymer having a sulfoalkyl-containing fluorene group in its principal chain.

The fuel cell according to an embodiment of the present invention may be used in a portable power supply including a casing, a fuel cell arranged in the casing, and a hydrogen cylinder arranged in the casing and configured to store hydrogen to be fed to the fuel cell.

The fuel cell according to an embodiment of the present invention may also be used in a portable power supply including a casing, a fuel cell arranged in the casing, and a fuel tank arranged in the casing and configured to store a liquid fuel to be fed to the fuel cell.

The fuel cell according to an embodiment of the present invention may also be used in a fuel cell power generator including a reformer configured to reform a fuel gas into an anode gas containing hydrogen, a fuel cell configured to generate electric power from the anode gas and a cathode gas containing oxygen, and a heat exchanger configured to exchange heat between a high-temperature anode gas discharged from the reformer, and a low-temperature fuel gas to be fed to the reformer.

According to an embodiment of the present invention, a polymer electrolyte which is resistant to oxidation-induced deterioration and is highly durable is obtained.

Further objects, features and advantages of the present invention will become apparent from the following description of the preferred embodiments with reference to the attached drawings.

DETAILED DESCRIPTION OF THE PREFERRED EMBODIMENTS

Figure 1:
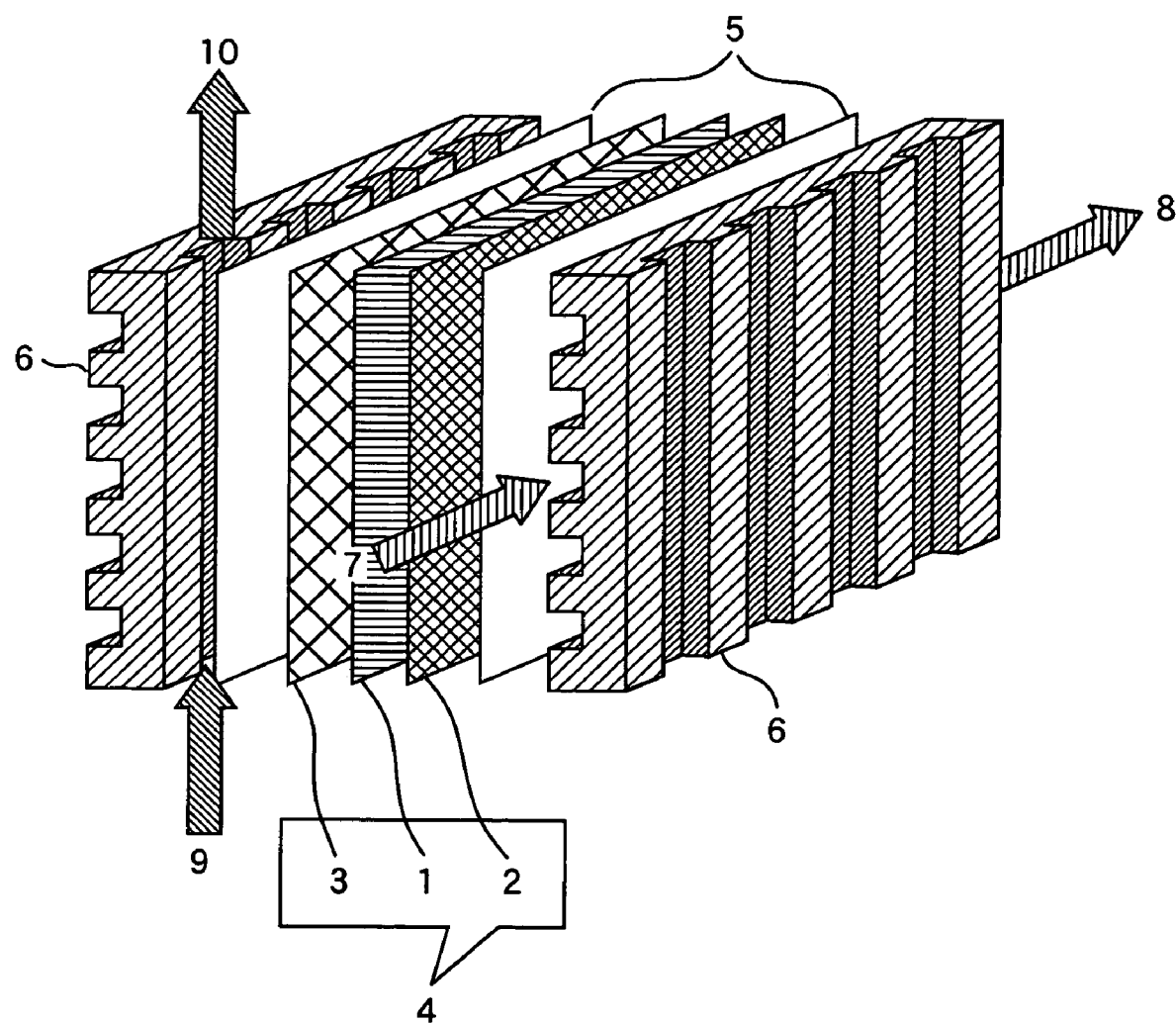
FIG. 1 shows a structure of a single cell for solid polymer fuel cells according to an embodiment of the present invention.

After investigations on the mechanism for the deterioration of electrolyte membranes, the present inventors have found that the sulfonated aromatic hydrocarbon electrolyte membrane according to related art have a molecular structure having a sulfonic group directly bound to an aromatic ring, and that the sulfonic group is liable to eliminate from the aromatic ring in the presence of a strong acid or at elevated temperatures to thereby decrease the ionic conductivity. They have also found that an aromatic polymer having an ion-exchangeable sulfonic group bound to fluorene with the interposition of an alkyl group is excellent as an electrolyte membrane so as to avoid the above problems. The present invention has been accomplished based on these findings.

A polymer electrolyte according to an embodiment of the present invention is an ion-exchange resin containing a fluorene group and having at least one of constitutional repeating units represented by Formulae (I), (II), and (III). In the formulae, $R_1$ to $R_5$ each represent one selected from alkyl groups having

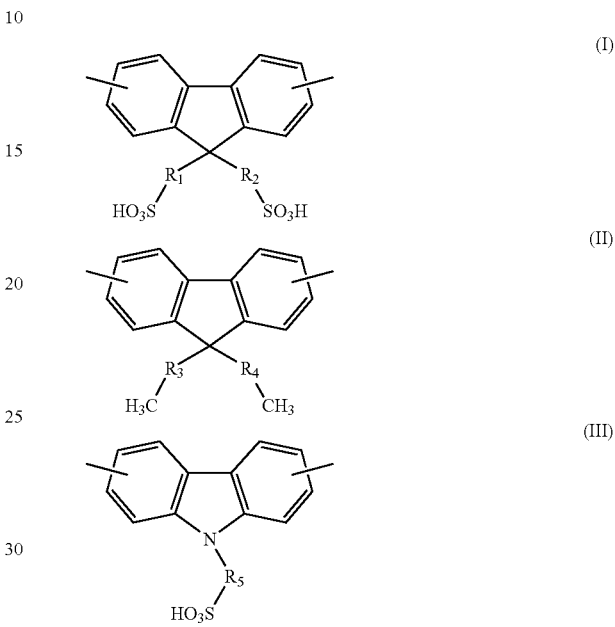

one to six carbon atoms. The resin containing a fluorene group has a molecular structure including a fluorene or carbazole skeleton, which skeleton highly acts to impart acid resistance, thermal stability, and low swellability to the resin. The resin may further includes another unit such as a biphenyl or naphthalene unit.

The fluorene copolymer according to an embodiment of the present invention can be synthetically prepared by any process such as the process of synthesizing a polyarylene using a nickel catalyst disclosed in Adv. Mater., 1998, 10, 993.

Polysulfones as the polymer electrolytes according to an embodiment of the present invention have at least one sulfonic group bound to an aromatic ring with the interposition of an alkyl group. They have an ion-exchange group equivalent weight of preferably about 500 to about 2500 g/mol and more preferably about 550 to about 1000 g/mol. If a polysulfone has an ion-exchange group equivalent weight exceeding 2500 g/mol, the fuel cell may have insufficient output performance. If it has an ion-exchange group equivalent weight less than 500 g/mol, the electrolyte membrane may have insufficient water resistance.

The ion-exchange group equivalent weight herein refers to the molecular weight of the copolymer per unit mole of sulfonic group introduced into the aromatic electrolyte and indicates the amount of introduced sulfonic groups. A higher ion-exchange group equivalent weight means a larger amount of sulfonic group introduced into the aromatic electrolyte. The ion-exchange group equivalent weight may be determined, for example, by $^1$H-NMR spectroscopy; elemental analysis; acid-base titration such as the process described in Japanese Examined Patent Application Publication (JP-B) No. Hei 01-52866; acid-base titration in a non-aqueous solvent using a solution of potassium methoxide in benzene and methanol as a normal solution.

To have an ion-exchange group equivalent weight of about 500 to about 2500 g/mol, the proportions of the units represented by Formulae (I), (II), and (III) may be preferably adjusted in preparation of the polymer electrolytes according to the embodiment of the present invention.

The ion-exchange resins according to an embodiment of the present invention are used as aromatic electrolyte membranes having sulfonic groups in fuel cells. The aromatic electrolyte membranes can be produced, for example, by solution casting, melting pressing, or melt extrusion. Among them, solution casting is preferred. For example, the aromatic electrolyte membranes may be produced by casting and applying a polymer solution to a substrate, and removing a solvent to thereby form a membrane.

The solvent for use in membrane formation is not specifically limited, as long as it may dissolve polyfluorene and may be removed thereafter. Examples thereof include aprotic polar solvents such as N,N-dimethylformamide, N,N-dimethylacetamide, N-methyl-2-pyrrolidone, and dimethyl sulfoxide.

The membranes may further include reinforcing materials such as porous membranes, nonwoven fabrics, fibrils, and fillers within ranges not adversely affecting the advantages of the embodiment.

The thickness of the polymer electrolyte membranes according to an embodiment of the present invention is preferably about 5 to about 200 µm and more preferably about 10 to about 100 µm. If the thickness is less than 5 µm, the resulting membrane may not have practically sufficient strength. If it exceeds 200 µm, the membrane may not have sufficiently reduced membrane resistance, namely, may not have improved power generation performance. The thickness of the membrane, if formed by solution casting, may be controlled by adjusting the concentration or amount of the solution to be applied to a substrate.

The electrolytes according to an embodiment of the present invention may further contain additives for use in regular polymers within ranges not adversely affecting the advantages of the embodiment. Such additives include, for example, crosslinking agents, plasticizers, stabilizers, and mold releasing agents.

A polymer electrolyte membrane/electrode assembly for fuel cells according to an embodiment of the present invention is preferably prepared by a method including the steps of applying an electrode paste to both sides of a principal plane of an aromatic polymer electrolyte membrane, the aromatic polymer electrolyte membrane including an aromatic polymer having a sulfoalkyl-containing fluorene group in its principal chain; and drying the applied film; or a method including the steps of applying an electrode paste to gas-diffusion electroconductive sheets, and drying the applied paste; and applying the coated surfaces of the gas-diffusion sheets to both sides of a principal plane of an aromatic polymer electrolyte membrane including an aromatic polymer having a sulfoalkyl-containing fluorene group in its principal chain.

The diffusion electrodes (diffusion sheets) for use in the polymer electrolyte membrane/electrode assembly for fuel cells may further contain additives, such as water-repellent agents and binders, according to necessity.

The catalytic metal (metal catalyst) is not specifically limited, as long as it is a metal accelerating an oxidation reaction of hydrogen and a reducing reaction of oxygen. Examples of catalytic metals include platinum, gold, silver, palladium, iridium, rhodium, ruthenium, iron, cobalt, nickel, chromium, tungsten, manganese, vanadium, and alloys of these metals. Of these, platinum and alloys thereof are preferred because they satisfactorily accelerate the oxidation reaction of hydrogen (fuel) and reducing reaction of oxygen.

The particle size of the catalytic metal is preferably 10 to 300 angstroms. The catalytic metal may be supported by a support, because the amount of the catalyst may be reduced, which contributes to lower cost. The amount of the catalytic metal on the support is preferably 0.01 to 10 mg/cm$^2$ after molding of the polymer electrolyte membrane/electrode assembly (diffusion electrode).

The electroconductive material to support fine particles of the catalytic metal is not specifically limited, as long as it is an electron-conductive material, and includes, for example, metallic materials, carbonaceous materials, and electroconductive polymers. Among them, carbonaceous materials are preferred because they may sufficiently impart electroconductivity and mechanical strength to the assembly.

Examples of the carbonaceous materials include carbon black such as furnace black, channel black, and acetylene black; activated carbon; and graphite. Each of these may be used alone or in combination.

The solution for coating an electrode catalyst according to an embodiment of the present invention is preferably used as the binder herein, but any known binder resin may also be used. Among such binder resins, preferred are fluorine-containing resins that have water repellency and are excellent in thermal stability and oxidation resistance, such as polytetrafluoroethylenes, tetrafluoroethylene-perfluoroalkyl vinyl ether copolymers, and tetrafluoroethylene-hexafluoropropylene copolymers. The water-repellent agent may be, for example, carbon fluoride.

An electrolyte membrane and an electrode may be bonded or assembled to form an electrolyte membrane/electrode assembly for fuel cells according to a known process. For example, the assembly may be prepared by a process including the steps of mixing carbon supporting a platinum catalyst powder with a suspension of polytetrafluoroethylene; applying the mixture to a carbon paper; carrying out heat treatment to yield a catalyst layer; applying an electrolyte solution having the same composition as the electrolyte membrane to the catalyst layer; and carrying out hot pressing to thereby yield an assembly integrated with the electrolyte membrane. Alternatively, the assembly may also be prepared by a process of applying an electrolyte solution to a platinum catalyst powder beforehand; a process of applying a catalyst paste to an electrolyte membrane; a process of applying an electrode to an electrolyte membrane by electroless plating; or a process of allowing an electrolyte membrane to adsorb a complex ion of a platinum group metal and reducing the ion.

According to an embodiment of the present invention, the assembly may be preferably prepared, for example, by adding carbon supporting an electrode catalyst to a polymer electrolyte solution (solution for coating an electrode catalyst) containing the copolymer and dispersing the same homogenously to thereby yield a catalyst paste, applying the catalyst paste to both sides of a polymer electrolyte for fuel cells, and drying the applied paste. The electrode catalyst is preferably, but is not limited to, a platinum group metal or an alloy thereof.

Fuel cells having various configurations may be provided by using the ion-exchange resin as an electrolyte membrane. For example, the following structure is given to a single cell for a solid polymer fuel cell. That is, the fuel cell comprises the polymer electrolyte membrane/electrode assembly; gas-diffusion electroconductive sheets arranged in intimate contact with both sides of the assembly, respectively; and electroconductive separators arranged outsides of the gas-diffusion electroconductive sheets. The polymer electrolyte membrane/electrode assembly includes an electrolyte membrane; an oxygen electrode arranged adjacent to one side of the principle plane of the membrane; and a hydrogen electrode arranged adjacent to the other side. The gas-diffusion electroconductive sheets are arranged in contact with the oxygen electrode and the hydrogen electrode of the assembly, respectively. The electroconductive separators have gas feed passages for the oxygen electrode and the hydrogen electrode, respectively.

The following structure is given to a portable power supply. That is, the power supply includes a casing; a fuel cell main body arranged in the casing; and a hydrogen cylinder configured to store hydrogen to be fed to the fuel cell main body.

According to another embodiment of the present invention, is also provided a portable power supply including a casing; the fuel cell main body arranged in the casing; and a fuel tank configured to store a liquid fuel to be fed to the fuel cell main body.

The present invention further provides, as another embodiment, a fuel cell power generator including a reformer configured to reform a fuel gas into an anode gas containing hydrogen; fuel cell configured to generate electric power from the anode gas and a cathode gas containing oxygen; and a heat exchanger configured to exchange heat between a high-temperature anode gas discharged from the reformer, and a low-temperature fuel gas to be fed to the reformer in which the fuel cell is the fuel cell according to an embodiment of the present invention.

The aromatic hydrocarbon ion-exchange resins, and electrolytes using the resins according to embodiments of the present invention may be more easily produced at lower cost than perfluorosulfonic polymers in related art. They have smaller fuel permeability, higher properties even after elapse of time, and higher durability than aromatic hydrocarbon ion-exchange resins used in related art. By using the electrolytes according to embodiments of the present invention, the electrolyte membrane, solution for coating electrode, membrane/electrode assembly, and fuel cell each with lower cost and longer lifetime may be provided.

The present invention will be illustrated in further detail with reference to several examples below, which by no means limit the scope of the present invention. The properties in these examples were determined by the following methods.

(1) Ion-Exchange Group Equivalent Weight

A sample sulfoalkylated polymer to be measured was converted into an acid form with a 1 N aqueous $H_2SO_4$ solution and was precisely weighed ["a" (g)] in a glass vessel; an excess amount of an aqueous calcium chloride solution was added to the weighed sample; and the mixture was stirred for ten hours. Hydrogen chloride formed in the reaction system was titrated with a 0.1 N standard aqueous sodium hydroxide solution having a titer "f" using phenolphthalein as an indicator [titration "b" (ml)]. The ion-exchange group equivalent weight (g/mol) was determined by calculation according to the following equation.

Ion-exchange group equivalent weight=(1000×*a*)/ (0.1×*b*×*f*)

(2) Evaluation of Output Performance of Single Cell

A sample electrolyte membrane/electrode assembly was integrated into a test cell, and the output performance of the resulting single fuel cell was evaluated. Hydrogen and oxygen gases were used as reaction gases. They were allowed to pass through a water bubbler to be humidified at one atmosphere and were fed to the test cell, respectively. The hydrogen and oxygen gases were fed at flow rates of 60 ml/min. and 40 ml/min., respectively, to the test cell at a temperature of 70° C. The output performance as the fuel cell was evaluated using the battery charge/discharge unit HJ-201B (the product of Hokuto Denko Corporation).

Embodiment 1

(1) Preparation of 2,7-dibromo-9,9-disulfobutylfluorene

An ethanol solution of potassium hydroxide was added dropwise to a stirred ethanol solution of 2,7-dibromofluorene (the product of Sigma-Aldrich Corporation, MO). Three equivalents of butane sultone were added dropwise to the reaction mixture, and a reaction was carried out by heating at 80° C. for six hours after the completion of the addition. The resulting mixture was cooled, from which precipitates were separated by filtration. The precipitates were recrystallized from methanol and thereby yielded a product (the titled compound).

(2) Preparation of 2,7-dibromo-N-sulfobutylcarbazole

An ethanol solution of potassium hydroxide was added dropwise to a stirred ethanol solution of 2,7-dibromofluorene (the product of Sigma-Aldrich Corporation, MO) by the procedure of the above process (1). An ethanol solution of 2 equivalents of butane sultone was added dropwise to the reaction mixture, and a reaction by heating was carried out at 80° C. for six hours after the completion of the addition. The reaction mixture was subjected to recrystallization from a 1:1 mixture of methanol and water and thereby yielded the titled compound.

(3) Preparation of Copolymer

Bis(1,5-cyclooctadiene)nickel, 2,2'-bipyridyl, and 1,5-cyclooctadiene were added to a 1:2 mixture of dimethylformamide and toluene, followed by heating and stirring at 80° C. in an argon gas atmosphere for thirty minutes. To the reaction mixture was added a 70:30 mixture of 2,7-dibromo-9,9-dibutylfluorene and 2,7-dibromo-9,9-disulfobutylfluorene (the products of Sigma-Aldrich Corporation) in a 1:2 mixture of dimethylformamide and toluene, followed by a reaction at 80° C. in a dark place for three days (the process of synthesizing polyarylene using a nickel catalyst described in Adv. Mater., 1998, Vol. 10, 993).

The reaction mixture was placed in a 5% solution of hydrochloric acid in methanol, and precipitates were separated by filtration. Next, the precipitates were subjected to a repeated procedure of washing with deionized water using a mixer and filtration under reduced pressure, until the filtrate became neutral. Then, drying at 120° C. under reduced pressure was carried out for ten hours to yield a polymer.

The polymer (copolymer) has an ion-exchange group equivalent weight of 540 g/mol. The $^1$H-NMR analysis of the polymer showed that it is a copolymer having proportions of the constitutional repeating units represented by Formulae (I), (II), and (III) identical to the charged proportions.

The polymer has a weight-average molecular weight of 32,000 in terms of polystyrene as determined by GPC. The gel permeation chromatography (GPC) was carried out under the following conditions.

GPC system: HLC-8220 GPC (Tosoh Corporation, Japan)
Column: Two TSKgel Super AWM-H columns (Tosoh Corporation, Japan)
Eluent: N-methylpyrrolidone containing 10 mmol/L of lithium bromide (4) Production of Electrolyte Membrane The copolymer obtained according to the process (3) was dissolved in N-methyl-2-pyrrolidone and thereby yielded a 20 percent by weight solution. The solution was applied to a glass substrate by casting, from which the solvent was removed by drying at 80° C. under reduced pressure for one hour and further drying at 150° C. for three hours, to thereby yield an electrolyte membrane (I). The electrolyte membrane (I) has a thickness of 32 μm and an ionic conductivity of 0.027 S/cm.

Figure 2:
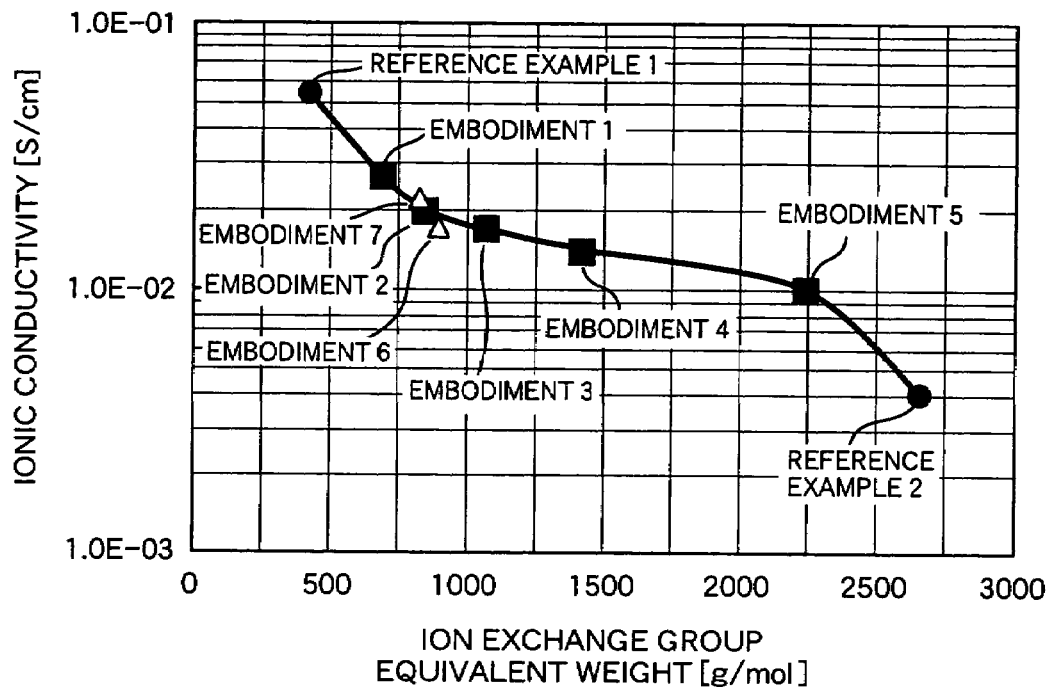
FIG. 2 shows how the ionic conductivity of polymer electrolyte membranes according to embodiments of the present invention varies depending on ion-exchange group equivalent weight.

FIG. 2 shows the relationship between the ionic conductivity and the ion-exchange group equivalent weight of the electrolyte membrane (I).

The electrolyte membrane (I) and 20 ml of ion exchanged water were placed in a well-closed stainless steel vessel having a Teflon (registered trademark) coated inner wall and were held to 120° C. for two weeks. The resulting electrolyte membrane (I) after two-week storage had an ionic conductivity substantially equal to the initial ionic conductivity and showed normal properties.

(5) Production of Electrode Paste and Membrane/Electrode Assembly

The copolymer prepared according to the process (3) was dissolved in a 80:20 solvent mixture of isopropanol and water to yield a 5 percent by weight solution of the copolymer. Carbon particles 50 percent by weight of platinum (the product of Tanaka Kikinzoku Kogyo Co., Ltd.) were homogenously dispersed in the solution so that the weight ratio of the platinum catalyst to the polymer electrolyte (copolymer) stood at 2:1. Thus, an electrode paste (I) was prepared. The electrode paste (I) was applied to both sides of the electrolyte membrane (I) prepared according to the process (4), was dried and thereby yielded a membrane/electrode assembly (I) supporting 0.25 mg/cm$^2$ of platinum.

(6) Durability Test of Single Fuel Cell

The membrane/electrode assembly (I) was allowed to absorb water by immersing in boiled deionized water for two hours. The resulting membrane/electrode assembly was integrated into the solid polymer single fuel cell shown in FIG. 1, and the output performance of the resulting fuel cell was evaluated.

The solid polymer single fuel cell shown in FIG. 1 includes the membrane/electrode assembly 4 according to Embodiment 1, gas diffusion layers 5 made from thin carbon paper and arranged in intimate contact with two electrodes of the membrane/electrode assembly 4, and electroconductive separators 6 arranged outside of the gas diffusion layers 5. The membrane/electrode assembly 4 includes an electrolyte membrane 1, an air electrode 2, and a hydrogen electrode 3. The electroconductive separators 6 serve to separate the electrode chambers and act as passages for feeding gases to the electrodes.

The single cell illustrated in FIG. 1 uses hydrogen and oxygen as an oxidizing agent and a reducing agent for electrode reactions, respectively. However, the electrolyte membrane according to an embodiment of the present invention may also be applied to a cell using a liquid fuel as the oxidizing agent. The liquid fuel is typified by an aqueous methanol solution but also includes, for example, diethyl ether and hydrazine.

Figure 3:
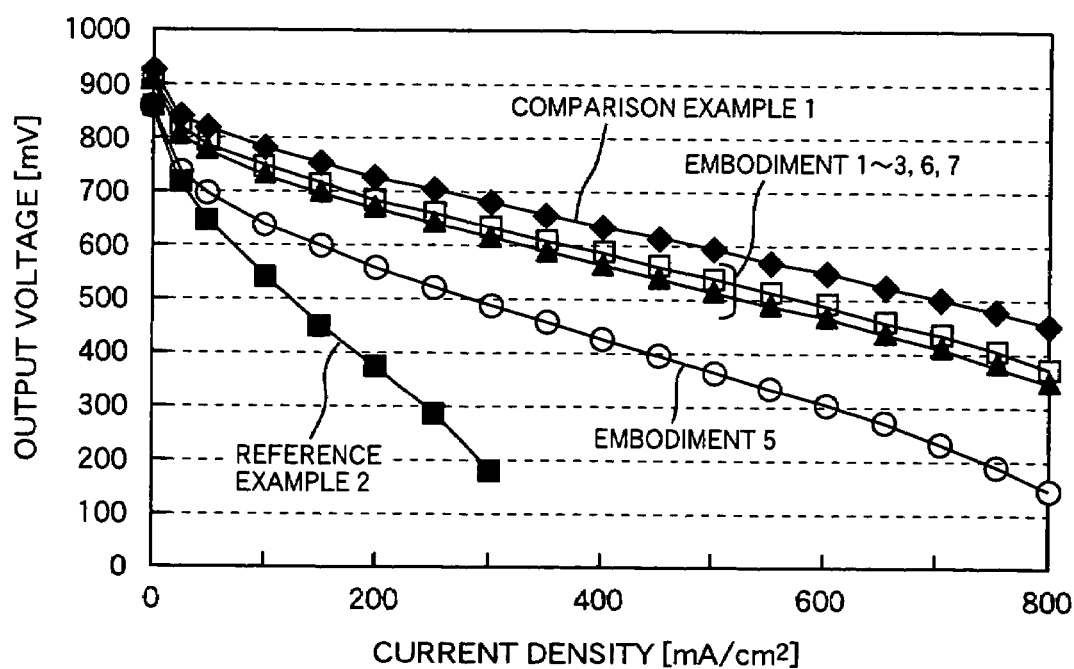
FIG. 3 shows how the outputs of single cells for solid polymer fuel cells according to embodiments of the present invention vary depending on the current density.

FIG. 3 shows the output performance of the fuel cell.

Figure 4:
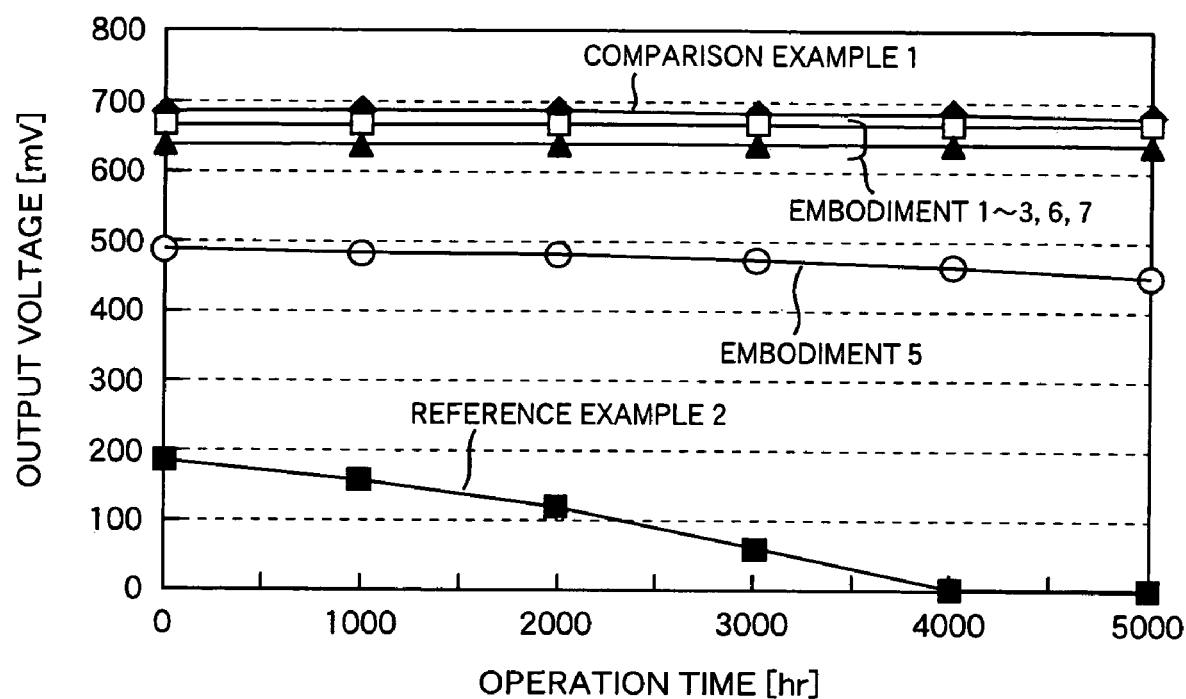
FIG. 4 shows the results in durability tests of single cells for solid polymer fuel cells according to embodiments of the present invention.

The solid polymer single fuel cell was subjected to a long-term operation test at a current density of 300 mA/cm$^2$, and the result is shown in FIG. 4.

The ion-exchange resin prepared according to Embodiment 1 includes a copolymer containing at least two of the constitutional repeating units represented by Formulae (I), (II), and (III). It is therefore excellent in durability such as acid resistance and heat resistance and may realize lower cost. By using this ion-exchange resin, polymer electrolytes, solid polymer electrolyte membranes, polymer electrolyte membrane/electrode assemblies, and fuel cells each showing high performance and high reliability may be provided. In addition, the ion-exchange resin according to Embodiment 1 is applicable to the electrolysis of water, halogen acids and sodium chloride, and to electrolyte membranes typically for oxygen enrichers, humidity sensors, and gas sensitive detectors.

Embodiment 2

(1) Preparation of Copolymer

A copolymer was prepared by the procedure of the process (3) in Embodiment 1, except for using 2,7-dibromo-9,9-dibutylfluorene and 2,7-dibromo-9,9-disulfobutylfluorene in a ratio of 80:20.

The resulting polymer has an ion-exchange group equivalent weight of 770 g/mol.

The $^1$H-NMR analysis of the polymer showed that it is a copolymer having proportions of the constitutional repeating units represented by Formulae (I), (II), and (III) identical to the charged proportions.

The polymer has a weight-average molecular weight of 33,000 in terms of polystyrene as determined by GPC.

(2) Production of Electrolyte Membrane

An electrolyte membrane (II) was prepared by the procedure of the process (4) in Embodiment 1, except for using the copolymer prepared according to the process (1) of this Embodiment. The resulting electrolyte membrane (II) has a thickness of 30 μm and an ionic conductivity of 0.020 S/cm.

FIG. 2 shows the relationship between the ionic conductivity and the ion-exchange group equivalent weight of the electrolyte membrane (II).

The electrolyte membrane (II) and 20 ml of ion exchanged water were placed in a well-closed stainless steel vessel having a Teflon (registered trademark) coated inner wall and were held to 120° C. for two weeks. The resulting electrolyte membrane (II) after two-week storage had an ionic conductivity substantially equal to the initial ionic conductivity and showed normal properties.

(3) Production of Electrode Paste and Membrane/Electrode Assembly

An electrode paste (II) was prepared by the procedure of the process (5) in Embodiment 1, except for using the copolymer prepared according to the process (1) of this Embodiment. The electrode paste (II) was applied to both sides of the electrolyte membrane (II) prepared according to the process (2), was dried, and thereby yielded a membrane/electrode assembly (II) supporting 0.25 mg/cm$^2$ of platinum.

(4) Durability Test of Single Fuel Cell

The membrane/electrode assembly (II) was allowed to absorb water by immersing in boiled deionized water for two hours. The resulting membrane/electrode assembly was integrated into a test cell, and the output performance of the resulting fuel cell was evaluated. The result is shown in FIG. 3.

The solid polymer single fuel cell was subjected to a long-term operation test at a current density of 300 mA/cm$^2$, and the result is shown in FIG. 4.

Embodiment 3

(1) Preparation of Copolymer

A copolymer was prepared by the procedure of the process (3) in Embodiment 1, except for using 2,7-dibromo-9,9-dibutylfluorene, 2,7-dibromo-9,9-disulfobutylfluorene, and 1,4-dibromonaphthalene in a ratio of 15:75:10. The polymer (copolymer) has an ion-exchange group equivalent weight of 950 g/mol.

The $^1$H-NMR analysis of the polymer showed that it is a copolymer having proportions of the constitutional repeating units represented by Formulae (I), (II), and (III) identical to the charged proportions.

The polymer has a weight-average molecular weight of 31,000 in terms of polystyrene as determined by GPC.

(2) Production of Electrolyte Membrane

An electrolyte membrane (III) was prepared by the procedure of the process (4) in Embodiment 1, except for using the copolymer prepared according to the process (1) of this Embodiment. The resulting electrolyte membrane (III) has a thickness of 31 μm and an ionic conductivity of 0.017 S/cm.

FIG. 2 shows the relationship between the ionic conductivity and the ion-exchange group equivalent weight of the electrolyte membrane (III).

The electrolyte membrane (III) and 20 ml of ion exchanged water were placed in a well-closed stainless steel vessel having a Teflon (registered trademark) coated inner wall and were held to 120° C. for two weeks. The resulting electrolyte membrane (III) after two-week storage had an ionic conductivity substantially equal to the initial ionic conductivity and showed normal properties.

(3) Production of Electrode Paste and Membrane/Electrode Assembly

An electrode paste (III) was prepared by the procedure of the process (5) in Embodiment 1, except for using the copolymer prepared according to the process (1) of this Embodiment. The electrode paste (III) was applied to both sides of the electrolyte membrane (III) prepared according to the process (2), was dried, and thereby yielded a membrane/electrode assembly (III) supporting 0.25 mg/cm$^2$ of platinum.

(4) Durability Test of Single Fuel Cell

The membrane/electrode assembly (III) was allowed to absorb water by immersing in boiled deionized water for two hours. The resulting membrane/electrode assembly was integrated into a test cell, and the output performance of the resulting fuel cell was evaluated. The result is shown in FIG. 3. The solid polymer single fuel cell was subjected to a long-term operation test at a current density of 300 mA/cm$^2$, and the result is shown in FIG. 4.

Embodiment 4

(1) Preparation of Copolymer

A copolymer was prepared by the procedure of the process (3) in Embodiment 1, except for using 2,7-dibromo-9,9-dibutylfluorene and 2,7-dibromo-9,9-disulfobutylfluorene in a ratio of 10:90.

The polymer (copolymer) has an ion-exchange group equivalent weight of 1460 g/mol.

The $^1$H-NMR analysis of the polymer showed that it is a copolymer having proportions of the constitutional repeating units represented by Formulae (I), (II), and (III) identical to the charged proportions.

The polymer has a weight-average molecular weight of 34,000 in terms of polystyrene as determined by GPC.

(2) Production of Electrolyte Membrane

An electrolyte membrane (IV) was prepared by the procedure of the process (4) in Embodiment 1, except for using the copolymer prepared according to the process (1) of this Embodiment. The resulting electrolyte membrane (IV) has a thickness of 30 μm and an ionic conductivity of 0.014 S/cm.

FIG. 2 shows the relationship between the ionic conductivity and the ion-exchange group equivalent weight of the electrolyte membrane (IV).

The electrolyte membrane (IV) and 20 ml of ion exchanged water were placed in a well-closed stainless steel vessel having a Teflon (registered trademark) coated inner wall and were held to 120° C. for two weeks. The resulting electrolyte membrane (IV) after two-week storage had an ionic conductivity substantially equal to the initial ionic conductivity and showed normal properties.

(3) Production of Electrode Paste and Membrane/Electrode Assembly

An electrode paste (IV) was prepared by the procedure of the process (5) in Embodiment 1, except for using the copolymer prepared according to the process (1) of this Embodiment.

The electrode paste (IV) was applied to both sides of the electrolyte membrane (IV) prepared according to the process (2), was dried, and thereby yielded a membrane/electrode assembly (IV) supporting 0.25 mg/cm$^2$ of platinum.

(4) Durability Test of Single Fuel Cell

The membrane/electrode assembly (IV) was allowed to absorb water by immersing in boiled deionized water for two hours. The resulting membrane/electrode assembly was integrated into a test cell, and the output performance of the resulting fuel cell was evaluated. The result is shown in FIG. 3. The solid polymer single fuel cell was subjected to a long-term operation test at a current density of 300 mA/cm$^2$, and the result is shown in FIG. 4.

Embodiment 5

(1) Preparation of Copolymer

A copolymer was prepared by the procedure of the process (3) in Embodiment 1, except for using 2,7-dibromo-9,9-dibutylfluorene, 2,7-dibromo-9,9-disulfobutylfluorene, and 4,4'-dibromobiphenyl in a ratio of 6:74:20. The polymer (copolymer) has an ion-exchange group equivalent weight of 2170 g/mol.

The $^1$H-NMR analysis of the polymer showed that it is a copolymer having proportions of the constitutional repeating units represented by Formulae (I), (II), and (III) identical to the charged proportions.

The polymer has a weight-average molecular weight of 32,000 in terms of polystyrene as determined by GPC.

(2) Production of Electrolyte Membrane

An electrolyte membrane (V) was prepared by the procedure of the process (4) in Embodiment 1, except for using the copolymer prepared according to the process (1) of this Embodiment. The resulting electrolyte membrane (V) has a thickness of 30 μm and an ionic conductivity of 0.010 S/cm.

FIG. 2 shows the relationship between the ionic conductivity and the ion-exchange group equivalent weight of the electrolyte membrane (V).

The electrolyte membrane (V) and 20 ml of ion exchanged water were placed in a well-closed stainless steel vessel having a Teflon (registered trademark) coated inner wall and were held to 120° C. for two weeks. The resulting electrolyte membrane (V) after two-week storage had an ionic conductivity substantially equal to the initial ionic conductivity and showed normal properties.

(3) Production of Electrode Paste and Membrane/Electrode Assembly

An electrode paste (V) was prepared by the procedure of the process (5) in Embodiment 1, except for using the copolymer prepared according to the process (1) of this Embodiment. The electrode paste (V) was applied to both sides of the electrolyte membrane (V) prepared according to the process (2), was dried, and thereby yielded a membrane/electrode assembly (V) supporting 0.25 mg/cm$^2$ of platinum.

(4) Durability Test of Single Fuel Cell

The membrane/electrode assembly (V) was allowed to absorb water by immersing in boiled deionized water for two hours. The resulting membrane/electrode assembly was integrated into a test cell, and the output performance of the resulting fuel cell was evaluated. The result is shown in FIG. 3. The solid polymer single fuel cell was subjected to a long-term operation test at a current density of 300 mA/cm$^2$, and the result is shown in FIG. 4.

Embodiment 6

(1) Preparation of Copolymer

A copolymer was prepared by the procedure of the process (3) in Embodiment 1, except for using 2,7-dibromo-9,9-dibutylfluorene and 2,7-dibromo-N-sulfobutylcarbazole in a ratio of 35:65. The polymer (copolymer) has an ion-exchange group equivalent weight of 820 g/mol.

The $^1$H-NMR analysis of the polymer showed that it is a copolymer having proportions of the constitutional repeating units represented by Formulae (I), (II), and (III) identical to the charged proportions.

The polymer has a weight-average molecular weight of 32,000 in terms of polystyrene as determined by GPC.

(2) Production of Electrolyte Membrane

An electrolyte membrane (VI) was prepared by the procedure of the process (4) in Embodiment 1, except for using the copolymer prepared according to the process (1) of this Embodiment. The resulting electrolyte membrane (VI) has a thickness of 32 μm and an ionic conductivity of 0.017 S/cm.

FIG. 2 shows the relationship between the ionic conductivity and the ion-exchange group equivalent weight of the electrolyte membrane (VI).

The electrolyte membrane (VI) and 20 ml of ion exchanged water were placed in a well-closed stainless steel vessel having a Teflon (registered trademark) coated inner wall and were held to 120° C. for two weeks. The resulting electrolyte membrane (VI) after two-week storage had an ionic conductivity substantially equal to the initial ionic conductivity and showed normal properties.

(3) Production of Electrode Paste and Membrane/Electrode Assembly

The polymer prepared according to the process (1) was dissolved in a 80:20 solvent mixture of isopropanol and water to yield a 5 percent by weight solution of the polymer. Carbon particles 40 percent by weight of platinum were homogenously dispersed in the solution so that the weight ratio of the platinum catalyst to the polymer electrolyte was 2:1. Thus, an electrode paste (VI) was prepared. The electrode paste (VI) was applied to both sides of the electrolyte membrane (VI) prepared according to the process (2), was dried, and thereby yielded a membrane/electrode assembly (VI) supporting 0.25 mg/cm$^2$ of platinum.

(4) Durability Test of Single Fuel Cell

The membrane/electrode assembly (VI) was allowed to absorb water by immersing in boiled deionized water for two hours. The resulting membrane/electrode assembly was integrated into a test cell, and the output performance of the resulting fuel cell was evaluated. The result is shown in FIG. 3. The solid polymer single fuel cell was subjected to a long-term operation test at a current density of 300 mA/cm$^2$, and the result is shown in FIG. 4.

Embodiment 7

(1) Preparation of Copolymer

A copolymer was prepared by the procedure of the process (3) in Embodiment 1, except for using 2,7-dibromo-9,9-dibutylfluorene and 2,7-dibromo-N-sulfobutylcarbazole in a ratio of 40:60. The polymer (copolymer) has an ion-exchange group equivalent weight of 710 g/mol. The $^1$H-NMR analysis of the polymer showed that it is a copolymer having proportions of the constitutional repeating units represented by Formulae (I), (II), and (III) identical to the charged proportions.

The polymer has a weight-average molecular weight of 31,000 in terms of polystyrene as determined by GPC.

(2) Production of Electrolyte Membrane

An electrolyte membrane (VII) was prepared by the procedure of the process (4) in Embodiment 1, except for using the copolymer prepared according to the process (1) of this Embodiment. The resulting electrolyte membrane (VII) has a thickness of 29 μm and an ionic conductivity of 0.022 S/cm.

FIG. 2 shows the relationship between the ionic conductivity and the ion-exchange group equivalent weight of the electrolyte membrane (VII).

The electrolyte membrane (VII) and 20 ml of ion exchanged water were placed in a well-closed stainless steel vessel having a Teflon (registered trademark) coated inner wall and were held to 120° C. for two weeks. The resulting electrolyte membrane (VII) after two-week storage had an ionic conductivity substantially equal to the initial ionic conductivity and showed normal properties.

(3) Production of Electrode Paste and Membrane/Electrode Assembly

The polymer prepared according to the process (1) was dissolved in a 80:20 solvent mixture of isopropanol and water to yield a 5 percent by weight solution of the polymer. Carbon particles 40 percent by weight of platinum were homogenously dispersed in the solution so that the weight ratio of the platinum catalyst to the polymer electrolyte was 2:1. Thus, an electrode paste (VII) was prepared. The electrode paste (VII) was applied to both sides of the electrolyte membrane (VII) prepared according to the process (2), was dried, and thereby yielded a membrane/electrode assembly (VII) supporting 0.25 mg/cm$^2$ of platinum.

(4) Durability Test of Single Fuel Cell

The membrane/electrode assembly (VII) was allowed to absorb water by immersing in boiled deionized water for two hours. The resulting membrane/electrode assembly was integrated into a test cell, and the output performance of the resulting fuel cell was evaluated. The result is shown in FIG. 3. The solid polymer single fuel cell was subjected to a long-term operation test at a current density of 300 mA/cm$^2$, and the result is shown in FIG. 4.

REFERENTIAL EXAMPLE 1

(1) Preparation of Copolymer

A copolymer was prepared by the procedure of the process (3) in Embodiment 1, except for using 2,7-dibromo-9,9-dibutylfluorene and 2,7-dibromo-9,9-disulfobutylfluorene in a ratio of 60:40. The resulting polymer has an ion-exchange group equivalent weight of 420 g/mol.

The $^1$H-NMR analysis of the polymer showed that it is a copolymer having proportions of the constitutional repeating units represented by Formulae (I), (II), and (III) identical to the charged proportions. The polymer has a weight-average molecular weight of 31,000 in terms of polystyrene as determined by GPC.

(2) Production of Electrolyte Membrane

An electrolyte membrane (I') was prepared by the procedure of the process (4) in Example 1, except for using the copolymer prepared according to the process (1) of this example. The resulting electrolyte membrane (I') has a thickness of 30 μm and an ionic conductivity of 0.054 S/cm.

FIG. 2 shows the relationship between the ionic conductivity and the ion-exchange group equivalent weight of the electrolyte membrane (I').

The electrolyte membrane (I') and 20 ml of ion exchanged water were placed in a well-closed stainless steel vessel having a Teflon (registered trademark) coated inner wall and were held to 120° C for two weeks. The resulting electrolyte membrane (I') significantly swelled and deformed.

REFERENTIAL EXAMPLE 2

(1) Preparation of Copolymer

A copolymer was prepared by the procedure of the process (3) in Embodiment 1, except for using 2,7-dibromo-9,9-dibutylfluorene, 2,7-dibromo-9,9-disulfobutylfluorene, and 4,4'-dibromobiphenyl in a ratio of 85:5:10. The resulting polymer had an ion-exchange group equivalent weight of 2720 g/mol.

The $^1$H-NMR analysis of the polymer showed that it is a copolymer having proportions of the constitutional repeating units represented by Formulae (I), (II), and (III) identical to the charged proportions. The polymer has a weight-average molecular weight of 30,000 in terms of polystyrene as determined by GPC.

(2) Production of Electrolyte Membrane

An electrolyte membrane (II') was prepared by the procedure of the process (4) in Embodiment 1, except for using the copolymer prepared according to the process (1) of this example. The resulting electrolyte membrane (II') has a thickness of 33 μm and an ionic conductivity of 0.004 S/cm.

FIG. 2 shows the relationship between the ionic conductivity and the ion-exchange group equivalent weight of the electrolyte membrane (II').

The electrolyte membrane (II') and 20 ml of ion exchanged water were placed in a well-closed stainless steel vessel having a Teflon (registered trademark) coated inner wall and were held to 120° C. for two weeks. The resulting electrolyte membrane (II') after two-week storage had an ionic conductivity substantially equal to the initial ionic conductivity and showed normal properties.

(3) Production of Electrode Paste and Membrane/Electrode Assembly

The polymer prepared according to the process (1) was dissolved in a 80:20 solvent mixture of isopropanol and water to yield a 5 percent by weight solution of the polymer. Carbon particles 40 percent by weight of platinum were homogenously dispersed in the solution so that the weight ratio of the platinum catalyst to the polymer electrolyte was 2:1. Thus, an electrode paste (II') was prepared.

The electrode paste (II') was applied to both sides of the electrolyte membrane (II') prepared according to the process (2), was dried, and thereby yielded a membrane/electrode assembly (II') supporting 0.25 mg/cm$^2$ of platinum.

(4) Durability Test of Single Fuel Cell

The membrane/electrode assembly (II') was allowed to absorb water by immersing in boiled deionized water for two hours. The resulting membrane/electrode assembly was integrated into a test cell, and the output performance of the resulting fuel cell was evaluated. The result is shown in FIG. 3. The solid polymer single fuel cell was subjected to a long-term operation test at a current density of 300 mA/cm$^2$ and the result is shown in FIG. 4.

REFERENTIAL EXAMPLE 3

(1) Preparation of Copolymer

Polymerization was carried out by the procedure of the process (3) in Embodiment 1, except for using 2,7-dibromo-9,9-dibutylfluorene and 2,7-dibromo-9,9-disulfobutylfluorene in a ratio of 55:45. The resulting reaction mixture was placed in a 5% solution of hydrochloric acid in methanol but it was dissolved therein and no polymer deposited.

COMPARATIVE EXAMPLE 1

(1) Production of Electrolyte Membrane

The output performance of a fuel cell was evaluated using a Nafion membrane as an electrolyte membrane. The Nafion membrane had been immersed in a 5% aqueous solution of hydrogen peroxide at 100° C. for thirty minutes and then immersed in a 5% diluted sulfuric acid at 100° C. for thirty minutes, and was washed with deionized water at 100° C.

The electrolyte membrane and 20 ml of ion exchanged water were placed in a well-closed stainless steel vessel having a Teflon (registered trademark) coated inner wall and were held to 120° C for two weeks. The resulting electrolyte membrane has an ionic conductivity identical to the initial ionic conductivity but it swelled and deformed.

(2) Production of Electrode Paste and Membrane/Electrode Assembly

Nafion was dissolved in a 80:20 solvent mixture of isopropanol and water to yield a 5 percent by weight solution of Nafion. Carbon particles 40 percent by weight of platinum were homogenously dispersed in the solution so that the weight ratio of the platinum catalyst to the polymer electrolyte was 2:1. Thus, an electrode paste (IV') was prepared. The electrode paste (IV') was applied to both sides of the electrolyte membrane (Nafion membrane) prepared according to the process (1), was dried, and thereby yielded a membrane/electrode assembly (IV') supporting 0.25 mg/cm$^2$ of platinum.

(3) Durability Test of Single Fuel Cell

The membrane/electrode assembly (IV') was allowed to absorb water by immersing in boiled deionized water for two hours. The resulting membrane/electrode assembly was integrated into a test cell, and the output performance of the resulting fuel cell was evaluated. The result is shown in FIG. 3. The solid polymer single fuel cell was subjected to a long-term operation test at a current density of 300 mA/cm$^2$, and the result is shown in FIG. 4.

According to the embodiments of the present invention, the polymer electrolytes can maintain high ionic conductivity while realizing inexpensive and exhibiting high durability.

What is claimed is:

1. A fuel cell comprising a membrane/electrode assembly with an anode, a cathode, and a polymer electrolyte membrane arranged between the anode and the cathode, wherein the polymer electrolyte membrane includes a copolymer in a constitution of an electrolyte, the copolymer containing at least two of the constitutional repeating units represented by the following Formulae (I), (II) and (III):

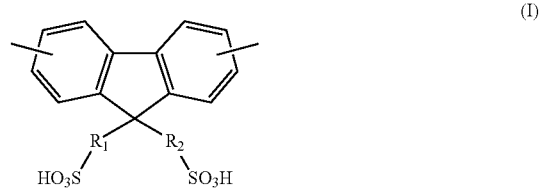

(I)

-continued

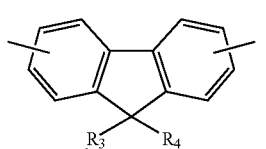
(II)

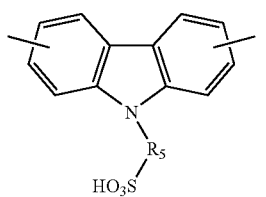
(III)

wherein each of $R_1$, $R_2$, $R_3$, $R_4$, and $R_5$ is independently a group selected from the group consisting of alkyl groups having one to six carbon atoms, and having an ion exchange equivalent weight of 500 to 2500 g/mol.

2. The fuel cell according to claim 1, wherein the copolymer has an ion-exchange equivalent weight of 550 to 1000 g/mol.

3. A membrane/electrode assembly comprising:
an anode;
a cathode;
and an ion-exchange resin comprising a copolymer in the constitution of an electrolyte, the copolymer containing at least two of the constitutional repeating units represented by following Formulae (I), (II), and (III):

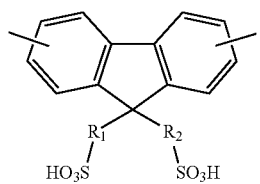
(I)

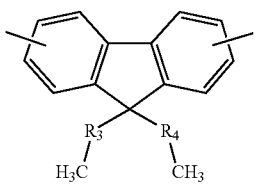
(II)

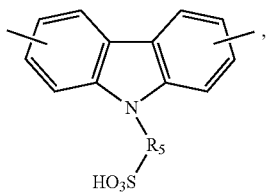
(III)

wherein
the copolymer has an ion-exchange group equivalent weight of 550 to 1000 g/mol, arranged between the anode and the cathode.

4. A fuel cell comprising the membrane/electrode assembly according to claim. 3

5. A polymer electrolyte composite membrane comprising:
a porous sheet having pores; and
an ion-exchange resin comprising a copolymer in the constitution of an electrolyte, the copolymer containing at least two of the constitutional repeating units represented by following Formulae (I), (II), and (III):

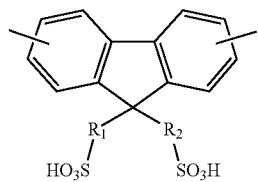
(I)

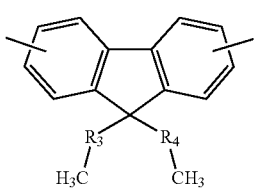
(II)

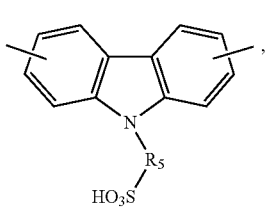
(III)

wherein
the copolymer has an ion-exchange group equivalent weight of 550 to 1000 g/mol, arranged in pores of the porous sheet at least in the surface layer thereof,
wherein the membrane is impermeable to fluids.

6. An electrode paste for a fuel cell, comprising:
a solution for coating an electrode catalyst comprising:
a solvent; and
an ion-exchange resin a copolymer in the constitution of an electrolyte, the copolymer containing at least two of the constitutional repeating units represented by following Formulae (I), (II), and (III):

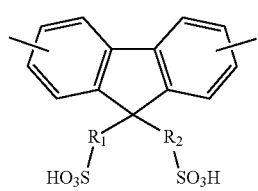
(I)

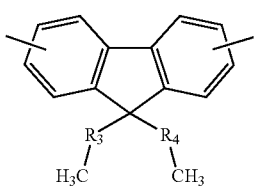
(II)

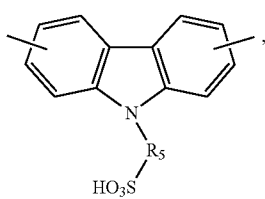

(III)

wherein the copolymer has an ion-exchange group equivalent weight of 550 to 1000 g/mol, dissolved in the solvent; and carbon particles supporting a catalytic metal and being dispersed in the solution.

7. The electrode paste according to claim 6, wherein the catalytic metal comprises at least one of platinum and platinum alloys.

8. A method of fabricating an electrode assembly including an electrode catalyst, comprising the steps of:

applying the electrode paste according to claim 6 to a principal plane of an aromatic polymer electrolyte membrane, the aromatic polymer electrolyte membrane including an aromatic polymer having a sulfoalkyl-containing fluorene group in its principal chain; and drying the applied paste.

9. A method of fabricating an electrode assembly including an electrode catalyst, comprising the steps of:

applying the electrode paste according to claim 6 to gas-diffusion electroconductive sheets, and drying the applied paste; and attaching the coated surfaces of the diffusion sheets to the both sides of a principal plane of an electrolyte membrane including an aromatic polymer having a sulfoalkyl-containing fluorene group in its principal chain.

10. A portable power supply comprising:

a casing;

a fuel cell arranged in the casing; and a hydrogen cylinder arranged in the casing and configured to store hydrogen to be fed to the fuel cell, wherein the fuel cell is the fuel cell according to claim 1.

11. A portable power supply comprising:

a casing;

a fuel cell arranged in the casing; and a fuel tank arranged in the casing and configured to store a liquid fuel to be fed to the fuel cell, wherein the fuel cell is the fuel cell according to claim 1.

12. A fuel cell power generator comprising:

a reformer configured to reform a fuel gas into an anode gas containing hydrogen;

a fuel cell configured to generate electric power from the anode gas and a cathode gas containing oxygen; and a heat exchanger configured to exchange heat between a high-temperature anode gas discharged from the reformer, and a low-temperature fuel gas to be fed to the reformer, wherein the fuel cell is the fuel cell according to claim 1.

* * * * *